(12) United States Patent
Kawamura et al.

(10) Patent No.: US 9,747,056 B1
(45) Date of Patent: Aug. 29, 2017

(54) DYNAMIC PARTITIONING FOR TAPE MEDIUM

(71) Applicant: INTERNATIONAL BUSINESS MACHINES CORPORATION, Armonk, NY (US)

(72) Inventors: Kousei Kawamura, Tokyo (JP); Koichi Masuda, Tokyo (JP); Sosuke Matsui, Higashimurayama (JP); Yutaka Oishi, Kawasaki (JP); Takahiro Tsuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/055,684

(22) Filed: Feb. 29, 2016

(51) Int. Cl.
*G06F 13/00* (2006.01)
*G06F 3/06* (2006.01)

(52) U.S. Cl.
CPC .......... *G06F 3/0644* (2013.01); *G06F 3/0604* (2013.01); *G06F 3/0643* (2013.01); *G06F 3/0682* (2013.01); *G06F 3/0686* (2013.01)

(58) Field of Classification Search
CPC .... G06F 3/0644; G06F 3/0604; G06F 3/0643; G06F 3/0682; G06F 3/0686
USPC ...................... 711/111, 154, 217; 710/31, 38
See application file for complete search history.

(56) References Cited

U.S. PATENT DOCUMENTS

| 8,068,303 B2 | 11/2011 | Jaquette |
| 8,665,563 B2 | 3/2014 | Hostetter |
| 8,929,015 B2 | 1/2015 | Abe et al. |
| 8,976,479 B2 | 3/2015 | Cideciyan et al. |
| 2012/0323934 A1* | 12/2012 | Amir ................ G06F 17/30091 707/752 |
| 2015/0205532 A1* | 7/2015 | Ashida ................ G06F 3/0613 711/111 |

FOREIGN PATENT DOCUMENTS

| EP | 0795862 A2 | 9/1997 |
| JP | 2009015924 A | 1/2009 |

\* cited by examiner

*Primary Examiner* — Reba I Elmore
(74) *Attorney, Agent, or Firm* — Reza Sarbakhsh (57) ABSTRACT

The present invention provides a method of partitioning a tape medium dynamically by using a new method of writing data. It enables users to change size of the partitions later and to use all capacity of a tape efficiently. When a tape is divided into partitions, data is written in such a manner that the wraps are written in the partitions of the data band alternately in the forward direction and in the backward direction on the data band from the different sides of the data band toward the inside of the data band (W1,W2,W3 . . . ) and the location (C) at which the wrap (Wm) of the one partition collides with the wrap (Wn) of the other partition is defined as the demarcation (PB) of these partitions (P0, P1).

17 Claims, 9 Drawing Sheets

DYNAMIC PARTITIONING FOR TAPE MEDIUM

BACKGROUND

The present invention relates to a partitioning method for a tape medium, and more specifically, to a method of determining a boundary of adjacent partitions when dividing storage areas on a tape medium into at least two or more partitions logically.

Generally, media partitioning is one of the features implemented in LTO (Linear Tape-Open), which is an open format for tape storage media. When the media partitioning feature is supported, one physical tape medium can be logically partitioned such that it virtually serves as multiple tapes. This feature has made it possible to independently reuse any one of the logically demarcated partitions instead of reuse of the whole tape medium. However, the media partitioning feature requires that the sizes of the partitions obtained by logically dividing the medium be defined prior to actual use of the tape medium. As a result, it may occur that the partitions, when actually used, are not necessarily suited to the original use plan as the size of the partition is too large or too small, making it difficult to efficiently use the full capacity of the tape medium as a whole. Therefore, if the size of a partition can be dynamically changed according to the write-in situation of the data on the tape medium, the efficient use of the capacity of the tape medium will be achieved.

SUMMARY

A present invention provides a method of partitioning a tape medium (in the following, simply called "tape") dynamically by using a new method of writing data. It enables users to change size of the partitions later and to use all capacity of a tape efficiently. More particularly, the outline of the present invention is as follows. When a tape is divided into partitions, data is written in such a manner that the wraps are written in the partitions of the data band alternately in the forward direction and in the backward direction on the data band from the different sides of the data band toward the inside of the data band, and the location at which the wrap of the one partition collides with the wrap of the other partition is defined as the demarcation of these partitions.

In accordance with this scheme, it is when the data band has been fully used that the wraps collide with each other. Use of this scheme makes it possible to continue to use both the partitions even in the case of the data band in which the demarcation of the partitions exists until the data of all of the wraps are written therein. As the tape as a whole, it is made possible to write data in the partitions until full capacity of the tape is used and thus achieve efficient use of its capacity.

In one aspect of the present invention, a method of determining a boundary of adjacent partitions, when dividing storage areas on a tape into at least two or more partitions logically is provided. The tape has one or more data bands, and each data band has at least one wrap. The method comprises writing data on the at least one wrap in one of the data bands, the data being written in order toward a bottom of the at least one wrap from a top of the at least one wrap in a width direction of the tape while reciprocating a beginning of the tape to an end of the tape in a longitudinal direction of the tape. The method also comprises writing data on the at least one wrap in one of the data bands, the data being written in order toward the top of the at least one wrap from the bottom of the at least one wrap in the width direction of the tape while reciprocating the beginning of the tape to the end of the tape in the longitudinal direction of the tape. The method further comprises in a warp or a boundary of the at least one wrap, where the data being written in order toward a bottom of the at least one wrap from a top of the at least one wrap and the data being written in order toward the top of the at least one wrap from the bottom of the at least one wrap collide, setting a collision position, or a position at a predetermined distance from the collision position in the wrap and the boundary of the at least one wrap to the boundary of the adjacent partitions.

In another aspect of the present invention, a storage system for managing files using a file system comprising a host and at least one tape drive which is able to communicate with the host and write data on a tape to be loaded. The tape has one or more data bands and each data band has at least one wrap. Under the control of the file system to be executed by the host, the tape drive performs the steps of writing data on the at least one wrap in one of the data bands, the data being written in order toward a bottom of the at least one wrap from a top of the at least one wrap in a width direction of the tape while reciprocating a beginning of the tape to an end of the tape in a longitudinal direction of the tape, writing data on the at least one wrap in one of the data bands, the data being written in order toward the top of the at least one wrap from the bottom of the at least one wrap in the width direction of the tape while reciprocating the beginning of the tape to the end of the tape in the longitudinal direction of the tape, and in a warp or a boundary of the at least one wrap, where the data being written in order toward a bottom of the at least one wrap from a top of the at least one wrap and the data being written in order toward the top of the at least one wrap from the bottom of the at least one wrap collide, setting a collision position, or a position at a predetermined distance from the collision position in the wrap and the boundary of the at least one wrap to the boundary of the adjacent partitions.

In another aspect of the present invention, a computer program product for writing data on a tape loaded in a tape drive is provided. The tape has one or more data bands and each data band has at least one wrap. The computer program product comprises a computer readable storage medium having program instructions embodied therewith. The program instructions is executed by a computer to cause the tape drive to perform a method comprises writing data on the at least one wrap in one of the data bands, the data being written in order toward a bottom of the at least one wrap from a top of the at least one wrap in a width direction of the tape while reciprocating a beginning of the tape to an end of the tape in a longitudinal direction of the tape. The method also comprises writing data on the at least one wrap in one of the data bands, the data being written in order toward the top of the at least one wrap from the bottom of the at least one wrap in the width direction of the tape while reciprocating the beginning of the tape to the end of the tape in the longitudinal direction of the tape. The method further comprises in a warp or a boundary of the at least one wrap, where the data being written in order toward a bottom of the at least one wrap from a top of the at least one wrap and the data being written in order toward the top of the at least one wrap from the bottom of the at least one wrap collide, setting a collision position, or a position at a predetermined distance from the collision position in the wrap and the boundary of the at least one wrap to the boundary of the adjacent partitions.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
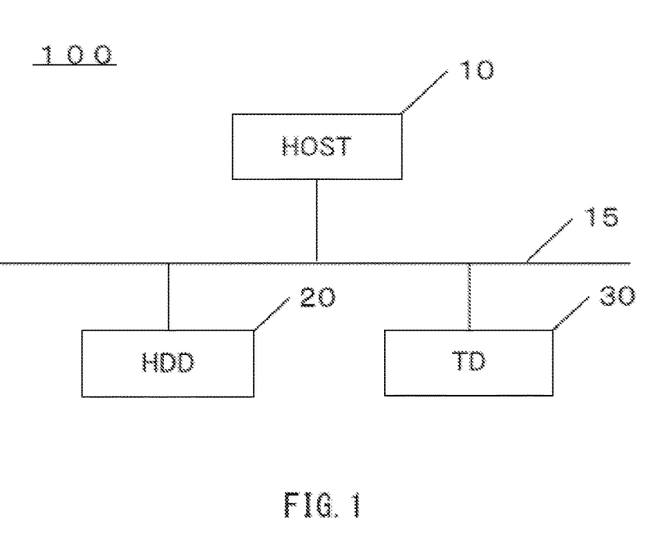
FIG. 1 illustrates a diagram showing a configuration example of a storage system which performs a file system of one embodiment of the present invention.

Detailed following is an explanation of one embodiment of the present invention with reference to the drawings. In the following description, if necessary, also with reference to the conventional writing method, an embodiment of the present invention will be described. FIG. 1 is a diagram showing a configuration example of a system/storage system which performs a file system of one embodiment of the present invention. The system 100 includes a host 10, a hard disk drive (HDD) 20, and a tape drive (TD) 30 which can communicate mutually through a network 15. Each of the host 10, HDD 20 and TD 30 can include at least one or more.

The host 10 can include computers, such as a server or a personal computer (PC). HDD 20 may be a type built in the host 10. Moreover, other storage devices such as a semiconductor memory (SSD etc.) can be used instead of HDD 20. TD 30 can include a single type or a set type TD like a tape library.

The host 10 mounts/executes a file system used in the present invention. The file system can include LTFS, for example. LTFS can carry out direct access to the files stored in the tape cartridge like HDD, a USB memory, or other removable recording medium such as CD-R, if the tape cartridge is inserted in TD. The following explains the example using LTFS as a file system. Off course, other file systems can be used to perform embodiments of the present invention.

Figure 2:
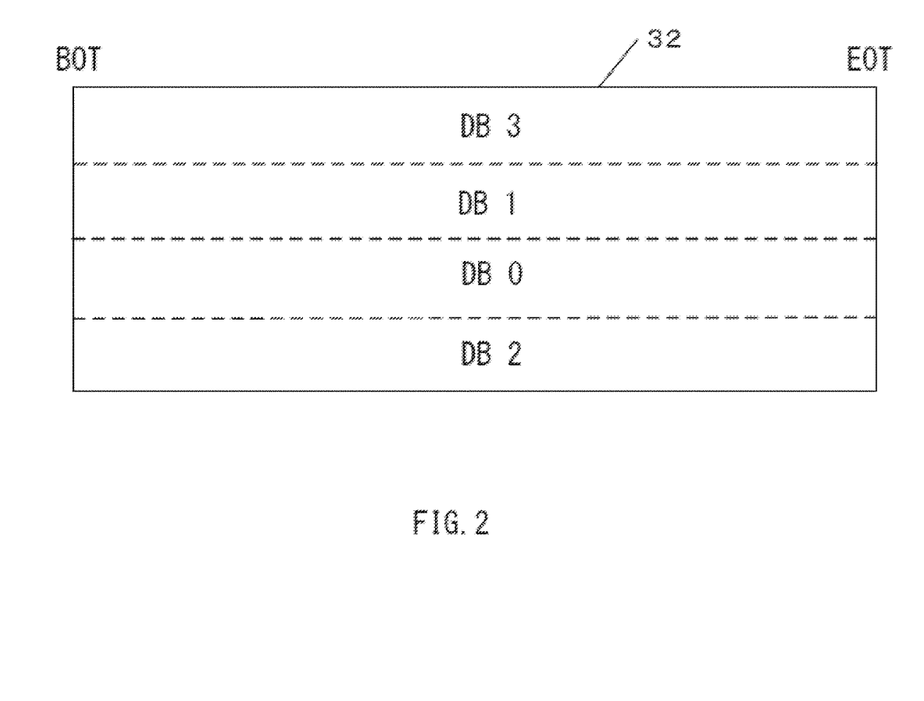
FIG. 2 is a diagram showing a configuration example of a tape which includes four data bands.

Next, a tape used by a tape drive (for example, TD 30 of FIG. 1) of one embodiment of the present invention is explained. FIG. 2 shows a diagram showing a configuration example of a tape which includes four data bands. As shown in FIG. 2, on a tape 32, there exist four areas called "data bands" (DB0, DB1, DB2, DB3) and data is written thereon one at a time in numerical order. Also, data continuously written from the beginning of the tape (BOT) in the longitudinal direction to the end of the tape (EOT) thereof is called a "wrap". Ten to several ten wraps can be written on one data band depending on the formats.

Figure 3:
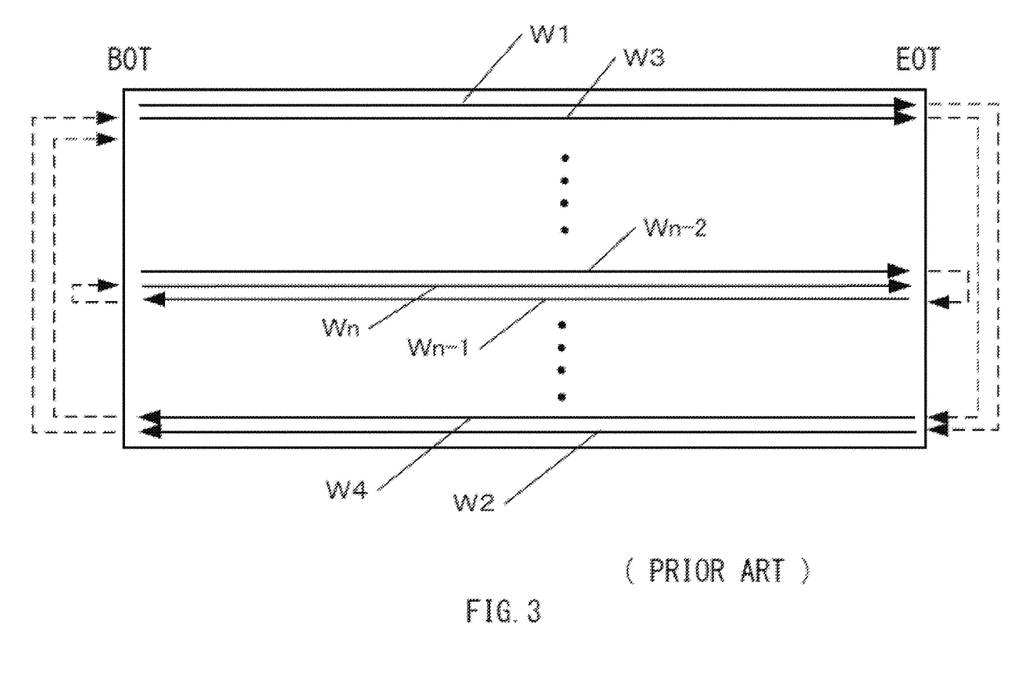
FIG. 3 is a diagram showing a configuration example of a conventional method of writing data on a data band of a tape.

FIG. 3 is a diagram showing a configuration example of a conventional method of writing data on a data band of a tape. In the conventional data writing scheme, the wraps are written on each data band sequentially from the outside to the inside of the data band as illustrated in FIG. 3 while the wraps extend either forward to EOT or BOT. That is, the top of the wrap W1 is written first and the lowest of the wrap W2 is written next. The second wrap W3 from the top is written and then the second wrap W4 from the bottom is written. By repeating the same operation until the last wrap Wn, data is written on each of the wraps sequentially in the direction from the outside to the inside of the data band.

Figure 4:
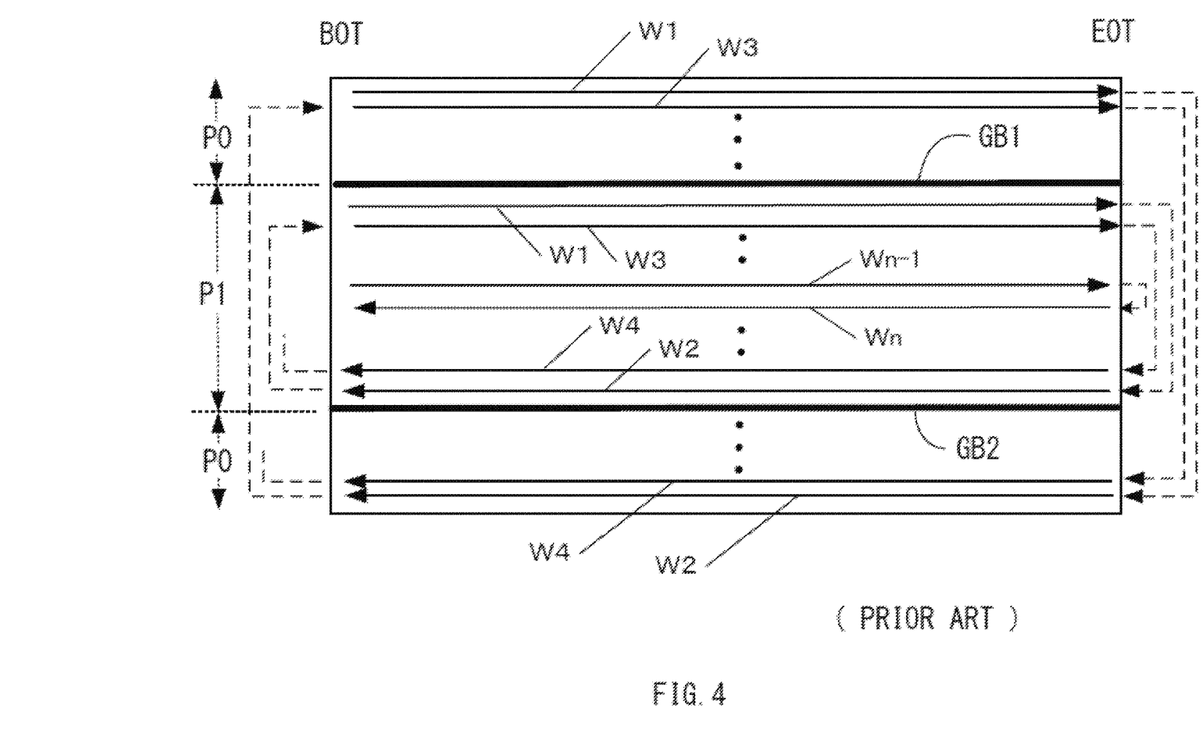
FIG. 4 is a diagram showing a configuration example of a conventional method of writing data on a data band which is divided into two partitions.

FIG. 4 is a diagram showing a configuration example of a conventional method of writing data on a data band which is divided into two partitions. In the example of FIG. 4, two guard bands GB1, GB2 are present in the middle of the data band, and separates the data band into two partitions P0, P1. The partition P1 is set in the area sandwiched by the two guard bands GB1, GB2. The partition P0 is separated into upper area and lower area in the data band by the two guard bands GB1, GB2. The guard band GB1 or GB2 is a gap that separates the wraps to prevent interference of signals between adjacent wraps. It is not written data in the guard band GB. The sizes of the partitions are defined prior to actual use of the tape. In the example of FIG. 4, the two partitions P0, P1 have the same data size.

In each partition, data is written in the same way as the writing shown in FIG. 3. The wraps are written on each partition sequentially from the outside to the inside of each partition (data band) as illustrated in FIG. 4 while the wraps extend either forward to EOT or BOT. That is, the data is written in the order of wrap W1, W2, W3, W4, . . . in each of the partitions P0 and P1. In the conventional writing method, it is necessary to provide a guard band at the boundary of partitions. Therefore, as the number of the demarcated partitions increases, writable data amount of the tape as a whole also becomes small. In view of the above, the present invention, for use of the tape divided into partitions, proposes a scheme for writing data on each data band as described below referring to FIG. 5 and FIG. 6.

Figure 5:
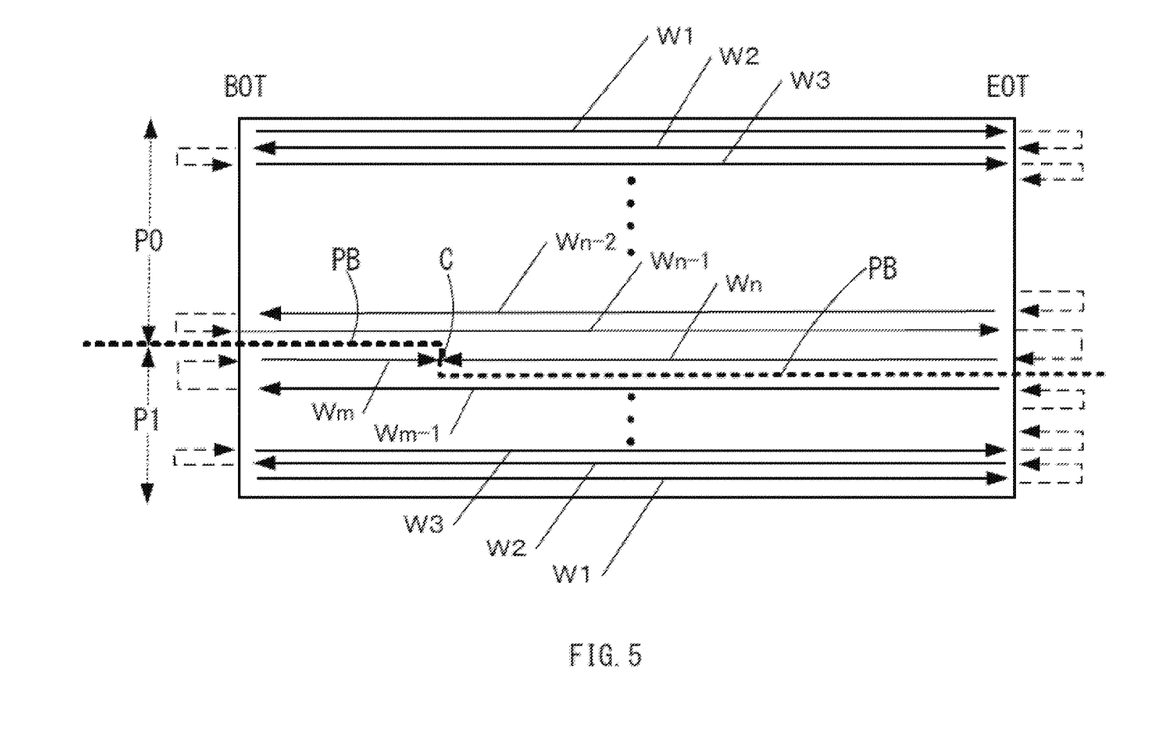
FIG. 5 is a diagram showing a configuration example of a method of writing data on a data band of a tape of one embodiment of the present invention.

FIG. 5 is a diagram showing a configuration example of a method of writing data on a data band of a tape of one embodiment of the present invention. In the illustrated example of FIG. 5, one tape is divided into two partitions P0 and P1. Wraps are written alternately in the forward direction and in the backward direction on the data band such that data of the two partitions are arranged starting from respective different sides toward the inside of the data band. In the upper area to be partition P0, the data is written in order toward the bottom of the wraps from the top of the wraps in the width direction of the tape (data band) while reciprocating BOT to EOT in the longitudinal direction of the tape. That is, the data is written in the order of wrap W1, W2, W3, . . . , Wn−2, Wn−1, Wn in the upper area to be partition P0.

On the other hand, in the lower area to be partition P1, the data is written in order toward the top of the wraps from the bottom of the wraps in the width direction of the tape (data band) while reciprocating BOT to EOT in the longitudinal direction of the tape. That is, the data is written in the order of wrap W1, W2, W3, . . . , Wm−1, Wm in the lower area to be partition P1. The point at which the wrap of the one partition collides with the wrap of the other partition is defined as the demarcation of the partitions. That is, in a warp where above two writing collide, the collision position or a position at a predetermined distance from the collision position in the wrap is set to a boundary of the adjacent partitions. In FIG. 5, by the position C to wrap Wn and wrap Wm collide, the boundary PB (represented by the dotted line) of two Partitions P0, P1 is determined/defined. In addition, the boundary between wrap Wn and wrap Wm can be set to a boundary of the adjacent partitions. In this case, the boundary of the adjacent partitions is set between adjacent two of the wraps without being set in a wrap.

Figure 6:
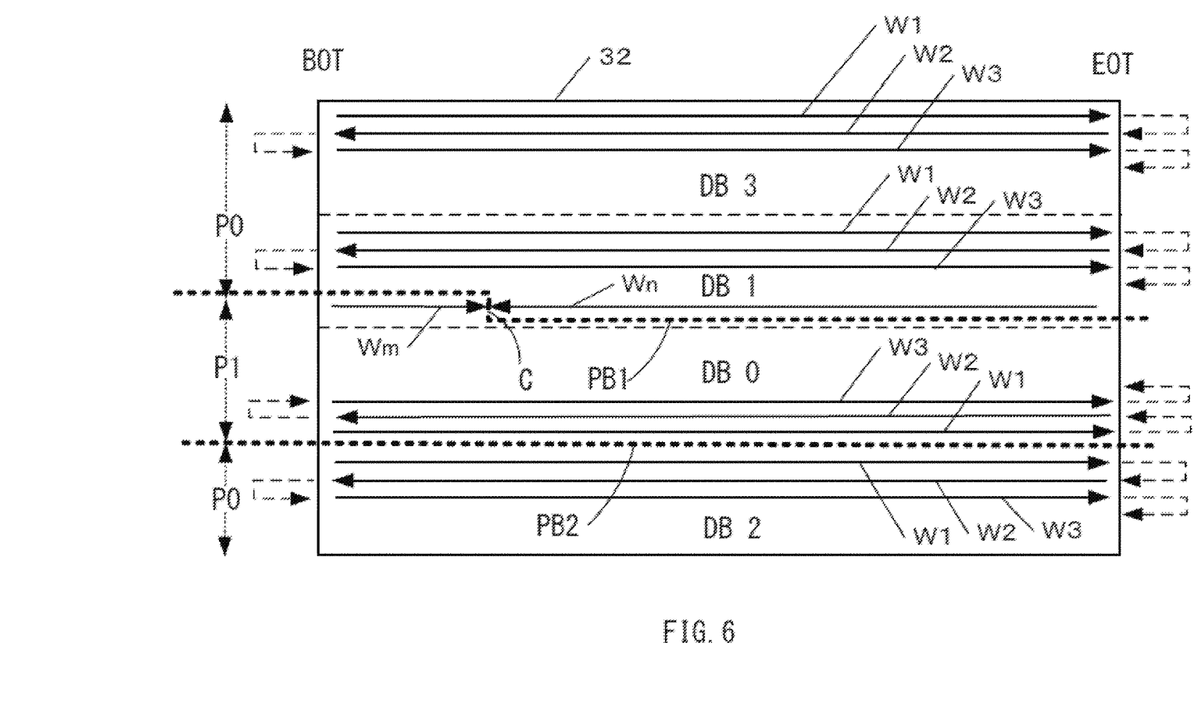
FIG. 6 is a diagram showing a configuration example of a method of writing data on a plurality of data bands of a tape of one embodiment of the present invention.

FIG. 6 is a diagram showing a configuration example of a method of writing data on a plurality of data bands of a tape of one embodiment of the present invention. In FIG. 6, the tape 32 includes four data bands DB0, DB1, DB2, DB3 and is divided into two partitions P0 and P1. In each of the three data bands DB1, DB2, DB3, the data is written in order toward the bottom of the wraps from the top of the wraps in the width direction of the tape (data band) while reciprocating BOT to EOT in the longitudinal direction of the tape. That is, the data is written in the order of wrap W1, W2, W3, . . . , in each of the three data bands DB1, DB2, DB3 to be partition P0.

On the other hand, in the data band DB0 to be partition P1, the data is written in order toward the top of the wraps from the bottom of the wraps in the width direction of the tape (data band) while reciprocating BOT to EOT in the longitudinal direction of the tape. That is, the data is written in the order of wrap W1, W2, W3, . . . , in the data band DB0 to be partition P1. The point at which the wrap of the one partition collides with the wrap of the other partition is defined as the demarcation of the partitions. That is, in a warp where above two writing collide, the collision position or a position at a predetermined distance from the collision position in the wrap is set to a boundary of the adjacent partitions. In FIG. 6, by the position C to wrap Wn and wrap Wm collide in the data band DB1, one of the (upper) boundary PB1 (represented by the dotted line) of two Partitions P0, P1 is determined/defined. In addition, as in the case of FIG. 5, the boundary between wrap Wn and wrap Wm can be set to a boundary (for example, PB1') of the adjacent partitions. In this case, the boundary (PB1') of the adjacent partitions is set between adjacent two of the wraps without being set in a wrap. The other (lower) boundary PB2 (represented by the dotted line) is set at the boundary between data band DB0 and DB2. Data band in which the boundary of the partitions is determined will vary depending upon the data writing status to the data band of the tape 32.

Since the tape drive is enabled to identify the manner in which the data is actually written until it reaches the specific position of the wrap on the specific partition of the tape, the tape drive can detect the location of the collision. In accordance with this approach, it is when the data band has been fully used that two wraps collide with each other. In the case where the data band is divided into two partitions, one partition uses the data band in the ascending order and the other partition uses the data band in the descending order as illustrated in FIG. 6, so that only one location of collision of the wraps exists throughout one entire tape.

Figure 7:
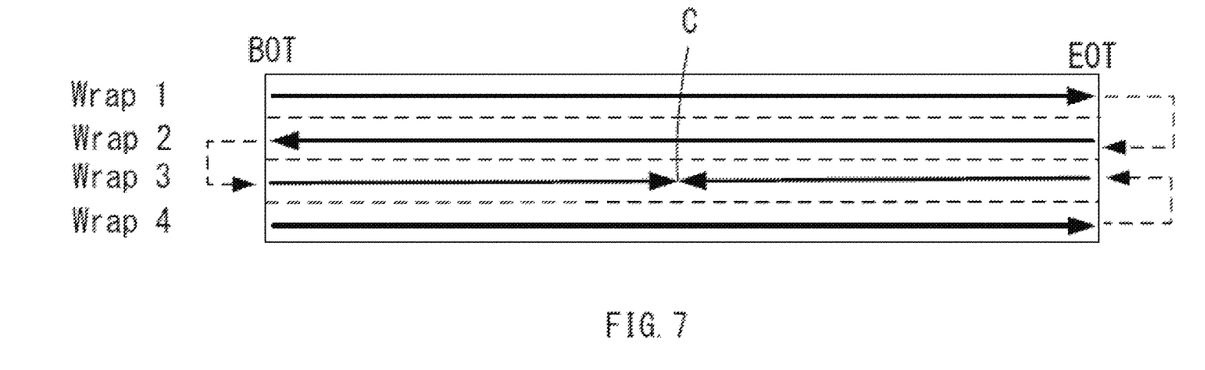
FIG. 7 is a diagram showing a configuration example of a method of writing data on a data band which includes even number of wraps.

FIG. 7 is a diagram showing a configuration example of a method of writing data on a data band which includes even number of wraps. In FIG. 7, four wraps 1,2,3,4 are shown as an example. In an actual tape, one data band contains dozens of wrap (for example, LTO-5: 20 wraps). In this case, data is written from the beginning of the tape (BOT) in both of the top wrap 1 and bottom wrap 4. Thus, as shown in FIG. 7, data writing toward the lower wrap from the upper wrap and data writing toward the upper wrap from the lower wrap collide at the point C in the wrap 3.

Figure 8:
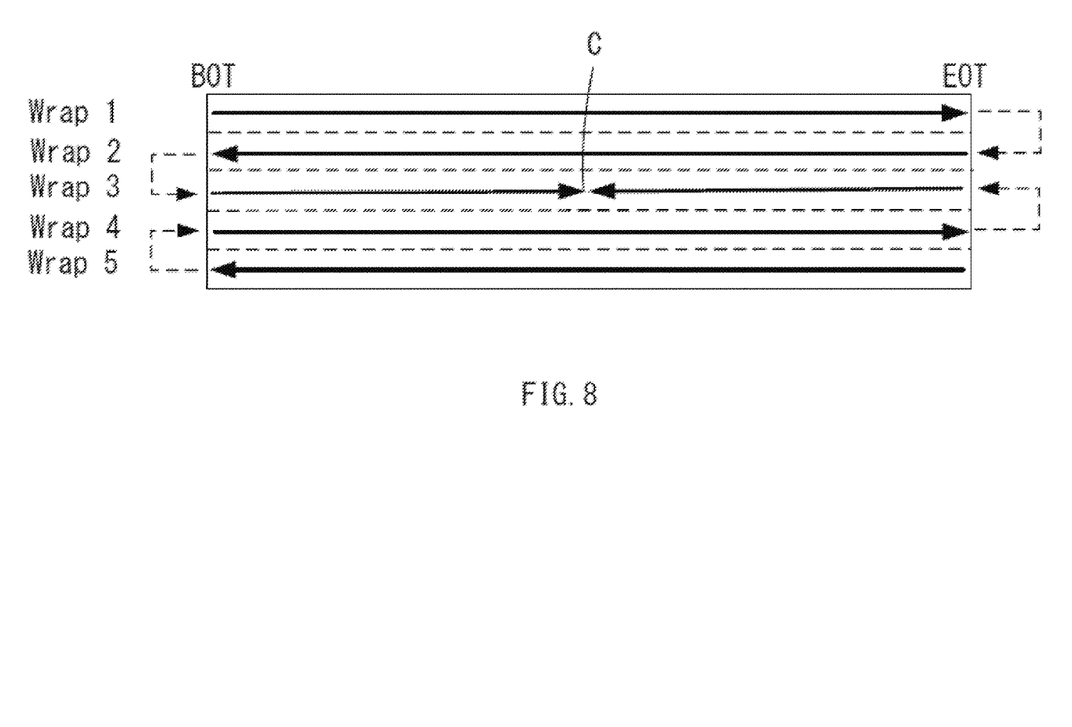
FIG. 8 is a diagram showing a configuration example of a method of writing data on a data band which includes odd number of wraps.

FIG. 8 is a diagram showing a configuration example of a method of writing data on a data band which includes odd number of wraps. In FIG. 7, five wraps 1,2,3,4, 5 are shown as an example. In this case, data is written from the beginning of the tape (BOT) in the top wrap 1 and data is written from the end of the tape (EOT) in the bottom wrap 4. Thus, as shown in FIG. 8, data writing toward the lower wrap from the upper wrap and data writing toward the upper wrap from the lower wrap collide at the point C in the wrap 3.

Since FIG. 7, FIG. 5, and FIG. 6 also are illustrated based on a format according to which multiple wraps in an even number are written on one data band, the top wraps of both the partitions begin from the side of BOT. In the case of another format according to which multiple wraps in an odd number (FIG. 8) are written on one data band, the scheme of collision of the wraps in the event that the last data band has been exhaustively used can be achieved by ensuring that the top wrap of one partition begins from the side of EOT.

Figure 9:
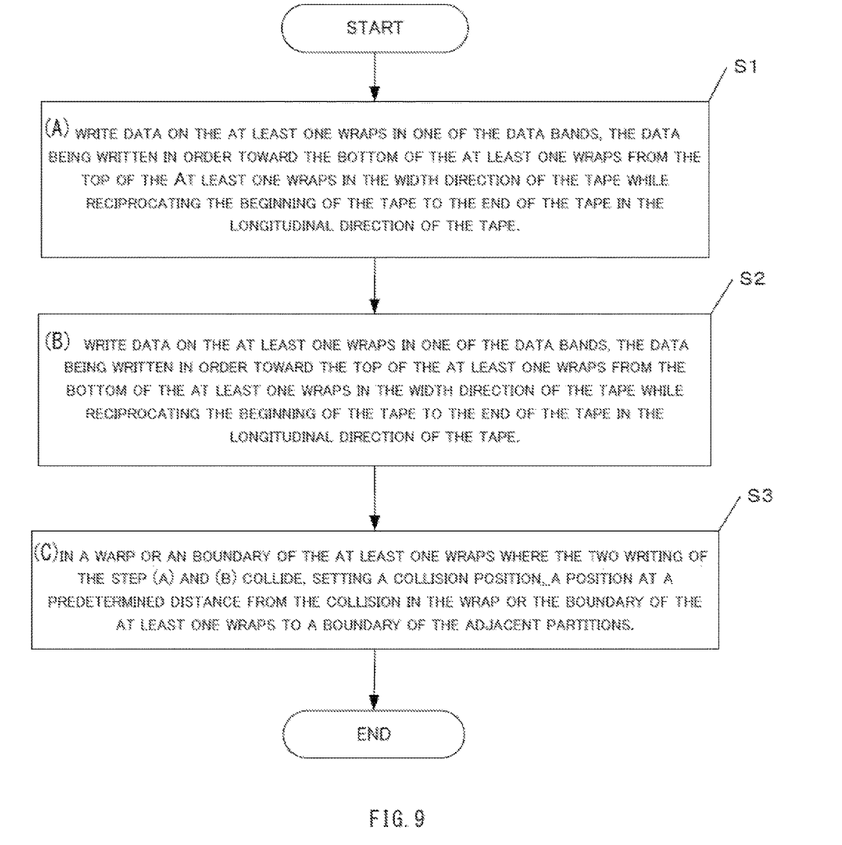
FIG. 9 is a chart showing a flow of a method of one embodiment of the present invention.

FIG. 9 is a chart showing a flow of a method of one embodiment of the present invention. The flow of FIG. 9 is performed by the tape drive (TD) 30 which is controlled by the host 10 (LTFS) in storage system 100 of FIG. 1, for example. The execution of the flow is performed using the predetermined software which can be used and hardware in the storage system 100 of FIG. 1. The software which has program instructions can be embodied in a computer program product comprising a computer readable storage medium. The program instructions can be executed by a computer such as the host 10 shown in FIG. 1 after the program instructions has been read out from the computer readable storage medium.

In step S1 of FIG. 9, as already described with reference to FIG. 5 and FIG. 6, the tape drive 30 writes data on the at least one wrap (for example, W1, W2, W3, 3, . . . , Wn−2, Wn−1, Wn in FIG. 5) in one of the data bands. The data is written in order toward the bottom of the at least one wrap from the top of the at least one wrap in the width direction of the tape while reciprocating the beginning of the tape (BOT) to the end of the tape (EOT) in the longitudinal direction of the tape.

In step S2, as already described with reference to FIG. 5 and FIG. 6, the tape drive 30 writes data on the at least one wrap (for example, W1, W2, W3, . . . , Wm−1, Wm in FIG. 5) in one of the data bands. The data is written in order toward the top of the at least one wrap from the bottom of the at least one wrap in the width direction of the tape while reciprocating the beginning of the tape (BOT) to the end of the tape (EOT) in the longitudinal direction of the tape. In step S3, as already described with reference to FIG. 5 and FIG. 6, in a warp where above two writing collide (for example, Wm, Wn in FIG. 5 or FIG. 6) or a boundary of the at least one wrap (for example, the boundary between Wm and Wn in FIG. 5 or FIG. 6), the collision position, a position at a predetermined distance from the collision position (for example, C in FIG. 5 or FIG. 6) in the wrap or the boundary of the at least one wrap is set to a boundary of the adjacent partitions (for example, P0, P1 in FIG. 5 or FIG. 6).

Implementation of the scheme for data writing proposed by the present invention makes it possible to continue to use both of the partitions even in the case of the data band where the boundary of the partition exists until the data for all of the wraps are written therein. Data can be written into both of the partitions until the capacity of one tape as a whole is fully used. Accordingly, it is made possible to efficiently utilize their capacities.

Also, in accordance with this scheme, only one area where the recording density for the last wrap being written is low exists for one data band. This is equivalent to a case where the tape is used without being divided into partitions, and when compared with the data writing scheme where the conventional tape partitioning feature is used, the advantage is achieved that the amount of data that can be written in the tape is increased. In addition, by using the method of the present invention, it is possible to eliminate the guard band (GB) which is shown for example in FIG. 4 and further increase the writing capacity of data.

In the practical use of the present invention, a possible implementation is that the size of the partitions into which the tape is to be divided is determined in advance by the user and thus the tape is used, and, when the user later wants to change the sizes of the partitions, the user is enabled to manually change the sizes. In this case, the application for writing data to the tape is allowed to accurately identify the unused capacity that can be used by the partitions on the basis of the sizes of the partitions and the state of data writing.

Also, the present invention may be implemented in such a manner that the sizes of the partitions are automatically changed on the side of the tape drive in accordance with the state of use of the divided partitions and the sizes are presented to the application. For example, if it is divided into two partitions, the amount of capacity obtained by adding a half of the entire free capacity of the entire tape to the capacities of the partitions that are already used in writing of data is defined to be the respective size of the partition at that point. In this case, when viewed from the side of the application that writes the data, the unused capacities of the partitions are increased or decreased in accordance with the state of use of the tape. However, it does not happen that both of the unused capacities of the partitions disappear, until the user has exhaustively used the tape.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiment of the present invention has been described with reference to the accompanying drawings. However, the present invention is not limited to the embodiment. The present invention can be carried out in forms to which various improvements, corrections, and modifications are added based on the knowledge of those skilled in the art without departing from the purpose of the present invention.

What is claimed is:

1. A method for determining a boundary of adjacent partitions, when dividing storage areas on a tape into at least two or more partitions, the tape having one or more data bands, each data band having at least one wrap, comprising the steps of:
   writing data on the at least one wrap in one of the data bands, the data being written in order toward a bottom of the at least one wrap from a top of the at least one wrap in a width direction of the tape while reciprocating a beginning of the tape to an end of the tape in a longitudinal direction of the tape,
   writing data on the at least one wrap in one of the data bands, the data being written in order toward the top of the at least one wrap from the bottom of the at least one wrap in the width direction of the tape while reciprocating the beginning of the tape to the end of the tape in the longitudinal direction of the tape, and
   in a warp or a boundary of the at least one wrap, where the data being written in order toward a bottom of the at least one wrap from a top of the at least one wrap and the data being written in order toward the top of the at least one wrap from the bottom of the at least one wrap collide, setting a collision position, or a position at a predetermined distance from the collision position in the wrap and the boundary of the at least one wrap to the boundary of the adjacent partitions.

2. The method of claim 1, wherein in response to the one of the data bands having an even number of wraps, the data being written in order toward a bottom of the at least one wrap from a top of the at least one wrap further comprises writing data from the beginning or the end of the top of the at least one wrap, and the data being written in order toward the top of the at least one wrap from the bottom of the at least one wrap further comprises includes the step of writing data from the beginning or the end of the bottom of the at least one wrap.

3. The method of claim 1, in response to the one of the data bands having an odd number of wraps, the data being written in order toward a bottom of the at least one wrap from a top of the at least one wrap further comprises writing data from the beginning or the end of the top of the at least one wrap, and the data being written in order toward the top of the at least one wrap from the bottom of the at least one wrap further comprises writing data from the end or the beginning of the bottom of the at least one wrap.

4. The method of claim 1, wherein the one of the data bands is the last data band where data is written in the one or more data bands.

5. The method of claim 1, wherein setting the boundary of the adjacent partitions further comprises determining each data size of the adjacent partitions.

6. A storage system for managing files using a file system comprising:
   a host; and
   at least one tape drive which is able to communicate with the host and write data on a tape to be loaded,
   the tape having one or more data bands, each data band having at least one wrap under the control of the file system to be executed by the host, the tap drive performing the steps of:
   writing data on the at least one wrap in one of the data bands, the data being written in order toward a bottom of the at least one wrap from a top of the at least one wrap in a width direction of the tape while reciprocating a beginning of the tape to an end of the tape in a longitudinal direction of the tape,
   writing data on the at least one wrap in one of the data bands, the data being written in order toward the top of the at least one wrap from the bottom of the at least one wrap in the width direction of the tape while reciprocating the beginning of the tape to the end of the tape in the longitudinal direction of the tape, and
   in a warp or a boundary of the at least one wrap, where the data being written in order toward a bottom of the at least one wrap from a top of the at least one wrap and the data being written in order toward the top of the at least one wrap from the bottom of the at least one wrap collide, writing data by a collision position or a position at a predetermined distance from the collision position in the wrap, or writing data by the boundary of the at least one wrap.

7. The storage system according to claim 6, wherein the collision position, the position at a predetermined distance from the collision position, or the boundary of the at least one wrap determines a boundary of the adjacent partitions.

8. The storage system according to claim 6, wherein in response to the one of the data bands having an even number of wraps, the data being written in order toward a bottom of the at least one wrap from a top of the at least one wrap further comprises writing data from the beginning or the end of the top of the at least one wrap, and the data being written in order toward the top of the at least one wrap from the bottom of the at least one wrap further comprises includes the step of writing data from the beginning or the end of the bottom of the at least one wrap.

9. The storage system according to claim 6, wherein in response to the one of the data bands having an odd number of wraps, the data being written in order toward a bottom of the at least one wrap from a top of the at least one wrap further comprises writing data from the beginning or the end of the top of the at least one wrap, and the data being written in order toward the top of the at least one wrap from the bottom of the at least one wrap further comprises writing data from the end or the beginning of the bottom of the at least one wrap.

10. The storage system according to claim 6, wherein the one of the data bands is the last data band where data is written in the one or more data bands.

11. The storage system according to claim 7, wherein the boundary of the adjacent partitions determines each data size of the adjacent partitions.

12. A computer program product for writing data on a tape loaded in a tape drive, the tape having one or more data bands, each data band having at least one wrap, the computer program product comprising a computer readable storage medium having program instructions embodied therewith, the program instructions executable by a computer to cause the tape drive to perform a method comprising the steps of:
  writing data on the at least one wrap in one of the data bands, the data being written in order toward a bottom of the at least one wrap from a top of the at least one wrap in a width direction of the tape while reciprocating a beginning of the tape to an end of the tape in a longitudinal direction of the tape,
  writing data on the at least one wrap in one of the data bands, the data being written in order toward the top of the at least one wrap from the bottom of the at least one wrap in the width direction of the tape while reciprocating the beginning of the tape to the end of the tape in the longitudinal direction of the tape, and
  in a warp or a boundary of the at least one wrap, where the data being written in order toward a bottom of the at least one wrap from a top of the at least one wrap and the data being written in order toward the top of the at least one wrap from the bottom of the at least one wrap collide, writing data by a collision position or a position at a predetermined distance from the collision position in the wrap, or writing data by the boundary of the at least one wrap.

13. The computer program product according to claim 12, wherein the collision position, the position at a predetermined distance from the collision position, or the boundary of the at least one wrap determines a boundary of the adjacent partitions.

14. The computer program product according to claim 12, wherein in response to the one of the data bands having an even number of wraps, the data being written in order toward a bottom of the at least one wrap from a top of the at least one wrap further comprises writing data from the beginning or the end of the top of the at least one wrap, and the data being written in order toward the top of the at least one wrap from the bottom of the at least one wrap further comprises includes the step of writing data from the beginning or the end of the bottom of the at least one wrap.

15. The computer program product according to claim 12, wherein in response to the one of the data bands having an odd number of wraps, the data being written in order toward a bottom of the at least one wrap from a top of the at least one wrap further comprises writing data from the beginning or the end of the top of the at least one wrap, and the data being written in order toward the top of the at least one wrap from the bottom of the at least one wrap further comprises writing data from the end or the beginning of the bottom of the at least one wrap.

16. The computer program product according to claim 12, wherein the one of the data bands is the last data band where data is written in the one or more data bands.

17. The computer program product according to claim 13, wherein the boundary of the adjacent partitions determines each data size of the adjacent partitions.

\* \* \* \* \*